Oct. 10, 1939.    O. W. PINEO    2,176,013
SPECTROPHOTOMETER AND SPECTROPHOTOMETRIC ANALYSIS AND PREDICTION
Filed Aug. 12, 1937    3 Sheets-Sheet 1
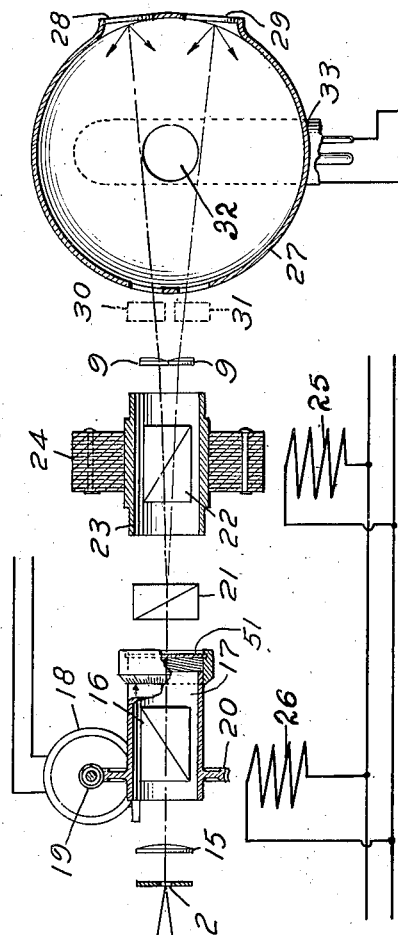
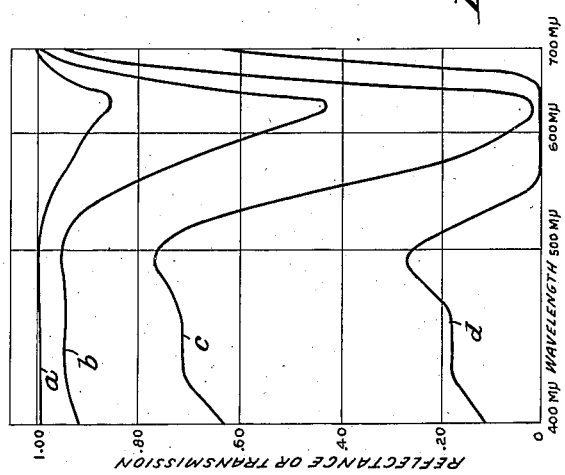
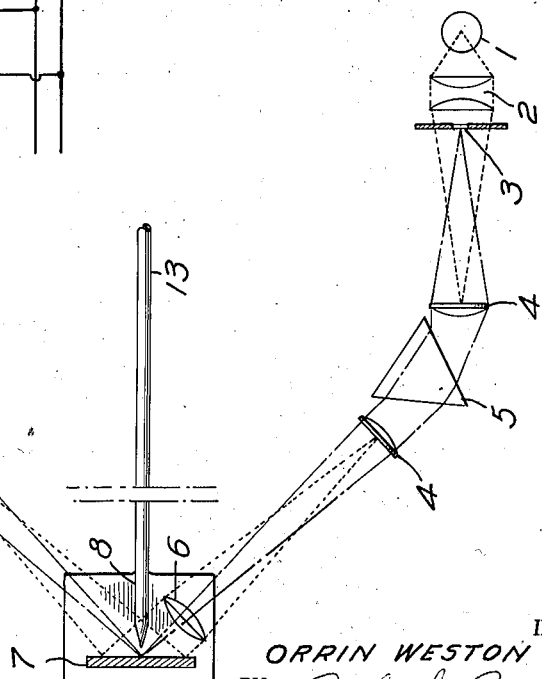
INVENTOR.
ORRIN WESTON PINEO,
BY Robert Ames Norton
ATTORNEY.

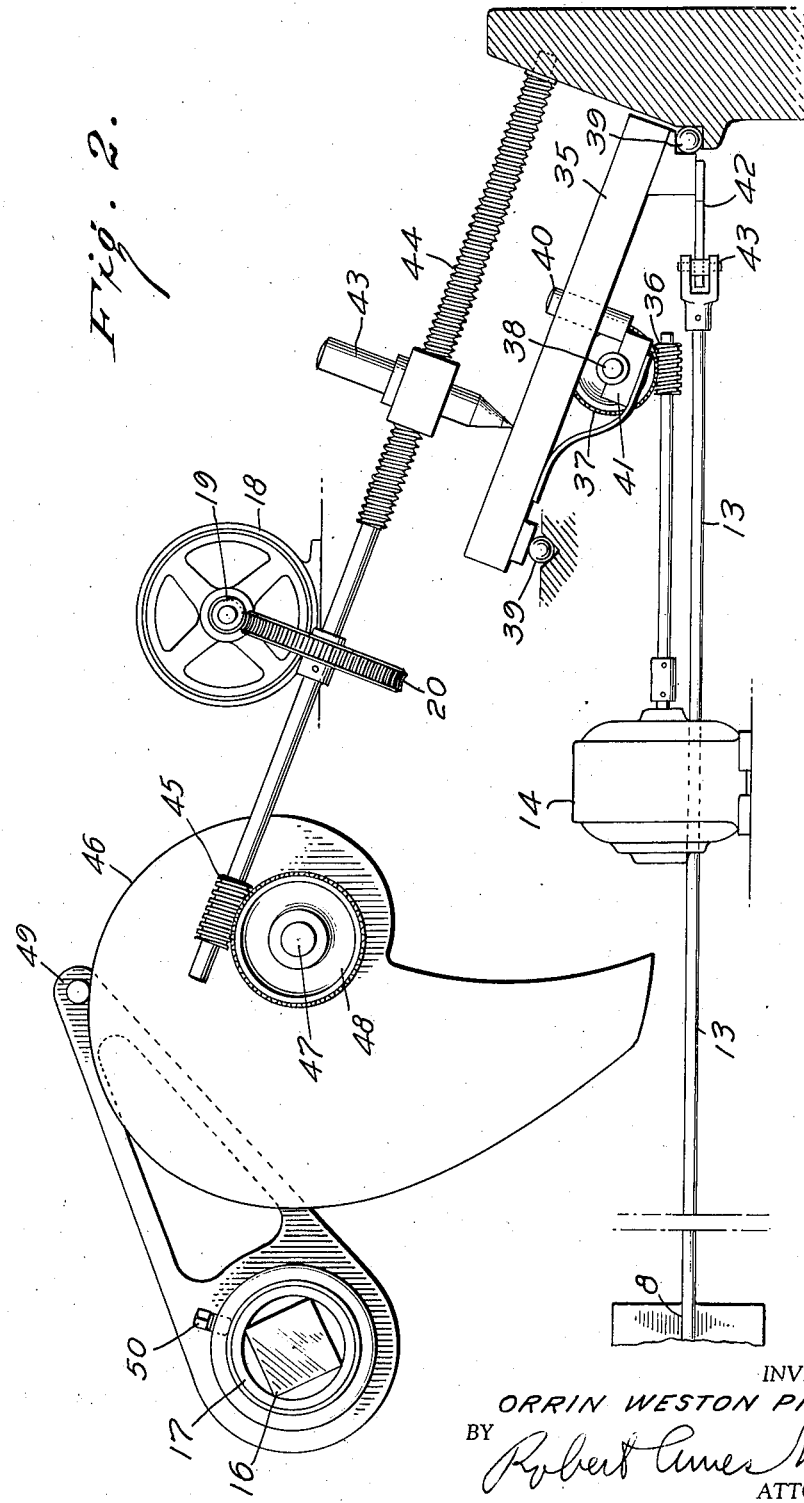

INVENTOR.
ORRIN WESTON PINEO,
BY Robert Armer Morton
ATTORNEY.

Patented Oct. 10, 1939

2,176,013

UNITED STATES PATENT OFFICE 2,176,013

SPECTROPHOTOMETER AND SPECTROPHO-
TOMETRIC ANALYSIS AND PREDICTION

Orrin Weston Pineo, Milo, Maine, assignor to The
Calco Chemical Company, Inc., Bound Brook,
N. J., a corporation of Delaware Application August 12, 1937, Serial No. 158,821

4 Claims. (Cl. 234—1.5)

This invention relates to recording spectrophotometers and more particularly to recording spectrophotometers of the flickering beam type.

A number of spectrophotometers have been designed using flickering beams for measuring reflectance or transmission of standards and samples. Such flickering beam photometers usually incorporate a polarizing element such as a Nicol or Rochon prism as a photometering element through which the light of the flickering beams passes. An example of such a photometer is the one described in my prior Patent No. 2,107,836 dated February 8, 1938. Photometering is effected by rotating the polarizing element. However, the angle through which the photometering prism has to be turned to compensate for a given unbalance of reflection or transmission between sample and standard at a given wavelength bears no linear relation to the ratio of the reflection or transmission of sample and standard.

It has been proposed to read a pointer linearly driven from the photometering element. If such a pointer were to be associated with a recording surface so as to draw a curve, readings thus obtained would not be directly translatable into ratio of reflection or transmission, because the ratio varies as the square of the tangent of the angle through which the photometering element is turned to effect balance.

In my prior patent above referred to, I have described a method of driving an indicating or recording element in which the disadvantages inherent in the spectrophotometers of the type where an indicating or recording element is linearly driven from the photometering element are avoided by interposing a drive linkage between the photometering element and the indicating device, whether visual or recording, which linkage includes a drive of varying ratio, the ratio variation being such that the motion of the indicating device is proportional to the square of the tangent of the angle (tan² α). As a result, indications are obtained or records are made which are proportional to the reflection or transmission ratio. With the above described drive, therefore, it is not necessary to calculate from visual or written indications of the spectrophotometer to obtain the correct readings. Thus, for example, with a recording spectrophotometer described in my patent above referred to having a linkage between photometering element and recording device containing a variable ratio drive varying in accordance with the tangent squared function referred to above, or a linear multiple thereof, a curve will be drawn, the ordinates of which correspond directly to reflection or transmission ratio and actual figures can be taken from such a curve if it is drawn on ordinary coordinate paper of suitable scale.

There are, however, a number of cases where response which is directly proportional to the transmission or reflectance ratio is not satisfactory. The most common case where the simple recording spectrophotometer of my prior patent will not give directly all the data needed is when transmission or reflectance samples of varying color concentration are encountered and particularly where a sample is of unknown color concentration as occurs when attempts are made to analyze a colored sample without knowing the strength of dyeing. When drawn on this simple type of recording spectrophotometer, the curves for two samples of identical color but of different color concentration will not be of the same shape because the variation with concentration is not a linear one. In the case of transmission samples the variations may be in concentration of color in the sample or in length of cell.

The difficulties encountered with samples of varying color concentration are overcome in the present invention in which the drive of varying ratio contains the tangent squared function modified by a second function which translates non-additive variations due to differences in concentration or light path length into additive variations so that curves for different concentrations of the same color or same mixture of colors will be of the same shape and will merely be displaced vertically on the coordinate paper by an amount proportional to the logarithm of the concentration.

The non-additive effects of varying concentrations can be transformed into additive effects because transmission is a function containing as one of its elements the specific absorbing property of the colored medium which at every wave length is a specific property of the color and is invariant with concentration or length of path through the medium. The transmission follows the formula (1) $$t(\lambda) = e^{-[\,]L}$$

where the square symbol [ ] defines the specific absorbing property of the color and L is length of light path. For a single color the specific absorbing property is a function of wave length, $k_1(\lambda)$, multiplied by the concentration $c_1$ so that $$t(\lambda) = e^{-k_1(\lambda) c_1 L}$$

Taking the natural logarithm of the reciprocal of the transmission, the equation is transformed as follows:

$$(2) \quad \log \frac{1}{t(\lambda)} = k_1(\lambda) c_1 L$$

If the logarithm of both sides of the equation is taken, the following results.

$$(3) \quad \log \log \frac{1}{t(\lambda)} = \log k_1(\lambda) + \log c_1 + \log L$$

The function on the left hand side of the equation is therefore given by the sum of the three functions on the right hand side, only one of which is variable in any particular measurement, namely $\log k_1(\lambda)$. Log L is a constant which is determined only by the size of the cell used and which can be kept constant for a series of measurements. Log $c_1$ varies with each concentration but is normally constant for the measurement of any sample. Therefore the only factor on the right hand side of the equation which is a variable function and which will therefore determine the shape of the curve drawn is the specific absorbing property of the color itself and changes in concentration will merely displace the curve vertically on coordinate paper. Therefore, for transmission a drive of varying ratio, the variation being the tangent squared function modified by the function on the left hand side of the equation above given, will draw a curve the shape of which depends only on the specific absorbing property of the dye and is invariant with concentration. Of course, in order to read numerical values from the curve, it must not be drawn on ordinary coordinate paper, but on paper the ordinates of which correspond to $$\log \log \frac{1}{t(\lambda)}$$

The above derivation of the formula for determining the variation of ratio in the drive presupposes only a single color with a single absorbing property $k_1(\lambda)$. Frequently measurements have to be made on a mixture of colors. I have found that in general each color molecule behaves practically as if the other color molecules were not present. In other words, if there are two or more different types of color molecules in the solution the transmission of which is to be measured, the square symbol [ ] instead of representing a single $k_1(\lambda)$ times a single concentration, $c_1$, has the following generalized formula $$(4) \quad [\ ] = k_1(\lambda) c_1 + k_2(\lambda) c_2 \ldots$$

So long as the relative proportions of molecules in the mixed color remain the same the invariance of the shape of the curve drawn for $$\log \log \frac{1}{t(\lambda)}$$

remains, as will be apparent from the following demonstration. Let us assume the generalized formula for [ ] given above and let us assume that the concentration of each component is doubled. The resulting formula will be $$(5) \quad k_1(\lambda) 2c_1 + k_2(\lambda) 2c_2 \ldots$$

This can be written $$(6) \quad 2[k_1(\lambda) c_1 + k_2(\lambda) c_2 \ldots ]$$

and when the log is taken, it will be obviously $$(7) \quad \log [k_1(\lambda) c_1 + k_2(\lambda) c_2 \ldots ] + \log 2$$

In other words, it has simply added an additive term which will result in displacing the curve vertically in proportion to the logarithm of the change in concentration. So long, therefore, as we are dealing with the same color mixture, that is to say with the same proportion of different colors, the present invention in its more complex form permits the tracing of curves which are invariant in shape with concentration and it is therefore no more necessary to know the actual concentration of a mixture than it is to know the actual concentration of a single color. In both cases, the curve will be identical in shape regardless of different concentrations. The cases where the proportions of different colors in a mixture may vary will be discussed at a later point and in particular with reference to Figure 6 of the drawings.

In the type of spectrophotometer described in my prior patent above referred to, $t(\lambda)$ is proportional to $\tan^2 \alpha$ where $\alpha$ is the angle through which the photometering element is turned. Therefore, in order to draw, on such a machine, a curve which is invariant in shape with concentration, Formula 3 must be modified to read $$(8) \quad \log \log \cot^2 \alpha = \log k_1(\lambda) + \log c_1 + \log L$$

Instead of subtracting the curve of one dye from the curve of the mixture, the mixture may be measured against the corresponding concentration of all but one of the dyes as a standard. The machine will then draw a difference curve which will be the curve of the specific absorbing power of the remaining dye.

It is an important advantage of recording spectrophotometers of the present invention using the varying ratio drive to give a curve for the specific absorptive property of the color that it is not necessary to make measurements for color on the particular material of interest at the moment. Thus, for example, it is entirely possible and very convenient to predict the color which will be obtained on a given sample from standardized data on the dyes obtained for example, by transmission measurements of water solutions.

The formula (1) is sufficient to illustrate the fact that the presence of light absorbing materials in a medium gives rise to a specific absorbing property of the medium independent of how such property may be manifested in a measurement, and that the specific absorbing properties of the component materials, each of which is a single characteristic function of wave length or curve on a wave length plot, combine to give the specific absorbing property of a compound medium always according to the simple additive law expressed by the square symbol. This law is dictated, as a matter of fact, by the independent action of the components in the absence of chemical interaction. On the other hand, the presence of light absorbing materials in a medium is made manifest in a wide variety of ways corresponding to different measurements made on the medium, and, in the case of a particular measurement, in a way determined by macroscopic, geometrical, and other considerations of the particular medium and measurement. The problem which the invention sets out to solve is to exhibit the effect of such absorbing materials in concrete cases in such a manner that the effects of the different materials may be segregated with a clarity equal to that of the general mathematical statements of the above two formulae.

The simplest type of drive of varying ratio is a cam having a profile which in conjunction with the cam follower corresponds to the function of the variable ratio. For practical operation, I find that a cam drive presents important advantages and is the preferred variable ratio drive. However, the invention is in no sense limited to the use of a cam and any other variable ratio drive with suitable variation can be used, such as, for example, eccentric gearing and the like.

In the drawings, Fig. 1 is a diagrammatic illustration of a flickering beam type of spectrophotometer according to my prior Patent No. 2,107,836 dated February 8, 1938;

Fig. 2 is an elevation of a recording means connected to the spectrophotometer of Fig. 1 and incorporating a cam for recording directly percentage variations of transmission or reflectance of sample and standard;

Fig. 3 is a series of curves for different concentrations of the same dye drawn by an instrument having a simple tangent squared cam as described in Fig. 2;

Figure 4:
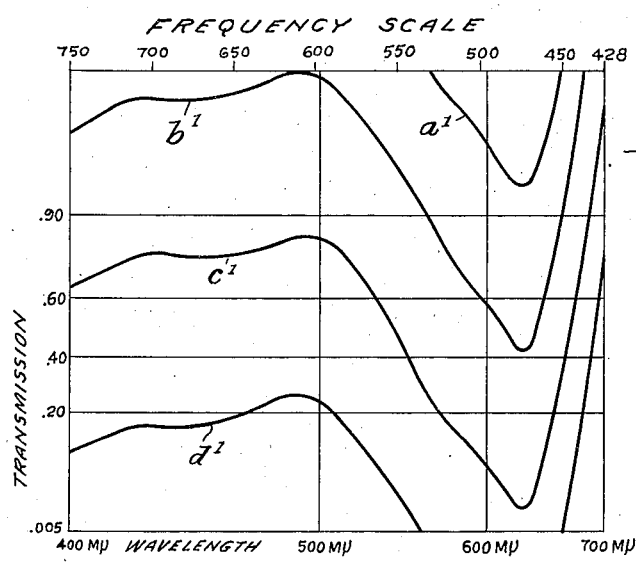
Fig. 4 is a series of curves for the same concentrations of the same dye as in Fig. 3 but drawn by an instrument in which the simple tangent squared cam of Fig. 2 is replaced by a complex cam to trace directly the curve of specific absorptive property.

In Fig. 1, the monochromator consists of incandescent lamp 1, preferably of the low voltage compact filament type, a pair of condensing lenses 2, a variable slit 3, collimating lenses 4, first prism 5, lens 6, mirror 7, knife edge 8, second prism 10, collimating lenses 11 and exit slit 12. The mirror and knife edge may be reciprocated by means of the rod 13 moving the slit defined by the knife edge through the spectrum so that the light passing slit 12 can be caused to traverse the visible spectrum.

The light leaving the slit 12 of the monochromator is collected by lens 15 onto the photometric prism 16 which is of a conventional Nicol or Rochon type. The prism is mounted in the hollow shaft 17 which is rotated by the motor 18 which is self-starting, the direction of rotation depending on the phase of the A. C. current energizing the armature as compared to the A. C. current in the field through the worm 19 and ring gear 20. The beam then passes through a bi-refringent plate 51 which rotates with the hollow shaft 7 but is adjustable thereon. The plate is adjusted to give retardation such that the light leaving the prism 16 is elliptically polarized. The relative size of the minor axis of the elipse is such that at the setting of prism 16 corresponding to zero reflectance of the sample 28, there is sufficient light in the beam illuminating the standard to balance out surface reflection from the sample. The correction for surface reflectance described above is not claimed as such in the present application.

The plane polarized beam leaves the photometric prism and passes through a Wollaston prism 21 where it is separated into two beams plane polarized at right angles to each other and the two beams pass through a flicker prism 22 which is mounted in a hollow shaft 23 being the center of the rotor 24 of a synchronous motor, the field 25 of which is energized by 60 cycle alternating current which is also used to energize the field 26 of the motor 18. The beams after passing through the flicker prism and the decentered lenses 9 enter into the integrating sphere 27 and strike targets 28 and 29. Transmission cells 30 and 31 (shown in dotted lines) are interposed in the two beams before they enter the integrating sphere.

In the wall of the integrating sphere is an aperture 32 through which the integrated light from the sphere passes and impinges on a photocell 33. The current from the photocell is amplified at flicker frequency by a high gain vacuum tube amplifier 34 and the amplified current which is also at flicker frequency is then fed to the armature of the motor 18 which rotates the photometric prism.

In operation the movement of the carriage carrying the mirror 7 and knife edge 8 causes the light from the monochromator to traverse the spectrum. The photometric prism plane polarizes a beam defined by the shape of the slit 12 and this beam will vary slightly in intensity with the degree of polarization in the monochromator at different wave lengths. The plane of polarization of the beam leaving the photometric prism is, of course, determined by the position of the prism which in turn determines the relative brightness of the two polarized beams leaving the Wollaston prism. The flicker prism 22 rotates at 1800 R. P. M. in order to give a flicker frequency of 60 cycles per second since each beam passes through two cycles from maximum to minimum for every revolution of the flicker prism. The flickering beams encountering the two targets 28 and 29 are reflected in accordance with the reflecting characteristics of the target surfaces at the particular wave length of monochromatic light or if uniform targets are used and cells of material are inserted at 30 and 31 the beams will vary in accordance with the transmission characteristics at the particular wave length of the comparison cell and the cell to be measured. The paths of the light rays are indicated on the drawings by lines in the customary manner.

Any unbalance in total light reflected from the respective targets during a complete cycle will produce a total variation of light in the integrating sphere, the variation being at flicker frequency, that is to say, 60 cycles per second. This 60 cycle current, together with any stray fluctuations at other frequencies which may result from the characteristics of the targets, are then amplified by the high gain amplifier which should be capable of amplifying a voltage produced by the photocell in the grid circuit of the first amplified tube of the order of 10 microvolts so as to produce an output from the amplifier of the order of 10 watts. This amplified current which, of course, contains as one of its main components the 60 cycle flicker frequency is then fed into the armature of the induction motor 18. Since the field of the induction motor 18 receives pure 60 cycle A. C. the motor will respond substantially only to the 60 cycle flicker frequency; in other words, the motor may be considered as a very sharply selective device which responds only to the frequency in its field. The motor rotates and moves the photometric prism until the latter has varied the relative intensity of the two beams from the Wollaston prism by an amount exactly sufficient to compensate for the variation in the light reflected from each target at which time there is no fluctuation of light in the integrating sphere at flicker frequency and, therefore, there will be no amplified 60 cycle flicker frequency in the tube of the amplifier and hence the motor 18 will stop. The highly selective characteristic of the motor 18 is very important since stray effects make it impossible to produce in the photocell output circuit anything like a pure sinusoidal 60 cycle current. On the contrary an oscillogram of the amplified photocell output shows the presence of an enormous number of stray frequencies. Because of the great selectivity of the motor 18, however, it is actuated only by 60 cycle component and therefore gives a true response to beam unbalance. The direction in which the motor 18 rotates depends, of course, on the phase of the 60 cycle component in the amplifier output which reverses with the reversal of the relative intensity of the reflected light from the two beams. Thus, for example, if there is unbalance so that the light reflected from target 28 is greater than that from 29, the resulting 60 cycle component after being amplified will have one phase, as compared to the 60 cycle current flowing in the field windings of the motor, whereas if the opposite condition takes place, that is to say, if the reflected light beam from target 29 is greater than that from 28 the 60 cycle in the output will have exactly the reverse phase and, of course, will turn the motor 18 but in the opposite direction. Before the photometer is put into operation initially it is necessary to adjust the phase relation of the amplifier and motor 18 so that the motor turns in the right direction and with maximum torque. This latter is adjusted by positioning the field 25 with respect to the prism 21. A reversal of leads, of course, will result in the motor turning the photometric prism away from balance instead of toward balance.

Fig. 2 shows in detail recording means used in conjunction with the spectrophotometer of Fig. 1 to produce a continuous graph of reflection or transmission characteristics of a given sample at the various wave lengths throughout the spectrum. Like parts bear like numerals. A wave length traversing motor 14 drives a worm 36 which rotates a worm wheel 37 keyed on a screw threaded shaft 38, the rotation of which causes a table 35 to move along the shaft, the table is supported on a suitable ball bearing 39 and is provided with a disengaging button 40 operating a spring held latch 41 which engages the screw thread on the shaft 38. One end of the table 35 carries a cam 42 which bears on a cam follower 43 on the end of the shaft 13 which shifts the monochromator mirror carriage to cause the monochromator light to traverse the spectrum. The profile of the cam 42 is chosen so that the movement of the shaft 13 will cause equal displacement of wave length in the monochromator light for equal movements of the table 35. Since the traversing of the monochromator is directly effected by movement of the table the latter can be moved rapidly by pressing the button 40 and moving the table by hand. This permits a rapid return of the table when a graph has been drawn and makes it unnecessary to return the table slowly by operation of the motor 14. Of course, if desired, the motor 14 may drive both the table and the cam directly, in which case manual return is not possible. I prefer, however, to use the form of drive shown where the table is moved by the motor and the table, in turn, actuates the monochromator.

A stylus 43 is on the threaded shaft 44 which is driven by the photometric prism motor 18 through a worm 19 and worm gear 20. The shaft 44 also carries a worm gear 45 which drives a shaft 47 through a worm gear 48. On the shaft 47 is keyed the cam 46 and the cam in turn moves a crank arm 49, which moves the photometric prism 16 in its hollow shaft 17. The profile of the cam is so chosen that the movement of the stylus 43 is proportional to the square of the tangent of the angle through which the prism 16 is moved. The stylus 43 will therefore respond to the percentage of difference in total light from the samples in the two beams and, therefore, the recording means will draw a graph which shows percentage of light transmission or reflection, as the case may be, of the sample at any wave length. In order to make fine adjustments so that the reflection from or transmission of the standard will correspond to 100% on the graph paper which is clamped to the table 35, it is sometimes necessary to make minute adjustments on the prism 16 and this may be done by means of the set screw 50 which permits shifting the hollow shaft 17 slightly in the crank arm 49. Such adjustment will be necessary only when the machine is first put into operation.

It is sometimes desirable to change the percentage transmission scale on the graph, thus, for example, it may be desirable to cause a greater movement of the stylus 43 for a given percentage change in reflection or transmission characteristic of the sample. This may be effected by changing the gear ratio between the shaft 44 and the shaft 47 or by using a shaft 44 with a different pitch of screw thread. In every case the response of the stylus 43 will still be proportional to the square of the tangent of the angle through which the prism 16 is turned but this proportion may be multiplied by constant factors introduced by the gear ratio and screw pitch.

In operation a sample to be tested for reflection forms one of the targets, for example 29, whereas target 28 is a standard white surface which may be obtained by smoking a magnesium carbonate block with magnesium oxide or in the case of fabrics an undyed fabric may be used as the standard. The synchronous motor rotating the flicker prism 22 is then started and brought up to speed. The wave length traversing motor 14 is then started at one end of the spectrum. The unbalance between the reflected beams at the start is amplified and the motor 18 rotates until the photometric prism 16 has been turned by the cam through a sufficient angle to balance the beams. The amount of rotation will move the stylus down the paper to the ordinate corresponding to a certain percentage of reflection. As the monochromator slowly traverses the spectrum the table 35 moves in step with it and at each wave length the motor 18 rotates in one or the other direction until the photometric prism has restored balance in the reflected beams. The stylus therefore draws a continuous curve or graph which is a true plot of the percentage reflection of the given sample corresponding to each wave length of the spectrum. Since cam 46 causes the motion of the stylus to be in proportion to the square of the tangent of the angle through which photometric prism 16 is turned the graph will plot true percentages.

When it is desired to measure the transmission of a colored solution or transparent or translucent colored substance, instead of reflection, the two targets 28 and 29 are made uniform white targets and the cell containing water of other standard is inserted at 30 while a cell containing the solution or a piece of the transparent material is inserted at 31. The measurement of the light transmission at different wave lengths proceeds precisely as described above in connection with the recording of a curve defining the reflecting characteristics, although, of course, the nature of the curve for a given coloring matter will naturally be different.

The flicker system shown in Fig. 1 is, of course, only by way of illustration and other flickering devices may be used, such as, for example, a stationary prism with a rotating half wave plate, a Kerr cell and the like, such types being described in my copending application Serial No. 11,600, filed March 18, 1935, now Patent No. 2,126,410 dated August 9, 1938. The present invention is, of course, not limited to any particular type of flicker photometer.

On Fig. 3, the curves for the various concentrations of the same dye are shown at $a$, $b$, $c$ and $d$. It will be noted that as the concentrations vary, the shape of the curve varies and unless the concentration is known, nothing very definite can be determined as to the nature of the dye itself from the examination of any particular curve. The curves of Fig. 3 are, of course, drawn by a recording spectrophotometer using the simple tangent squared cam as illustrated in Fig. 2. If this cam is substituted by one which gives directly for transmission measurement the specific absorptive property, the curves of the same concentrations of the same dye as in Fig. 3 now appear as $a'$, $b'$, $c'$ and $d'$ on Fig. 4. It will be noted that the shape of these curves is invariant and they are merely displaced vertically by variations in concentration.

Figure 5:
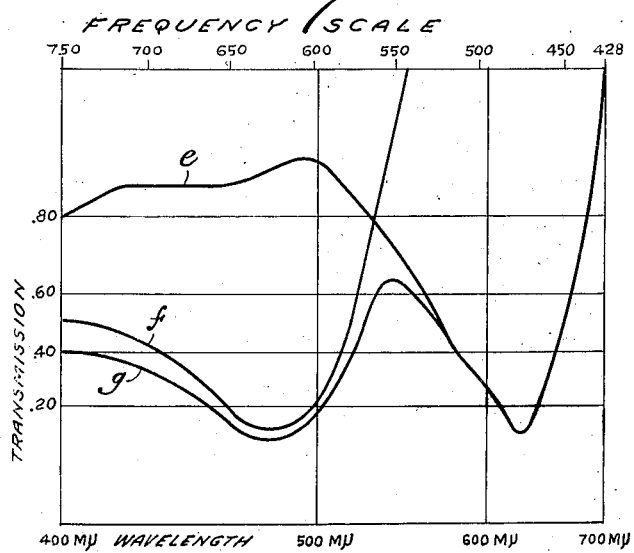
Fig. 5 shows two curves representing two different component dyes and a curve representing a mixture of the two components, all applied to a transmisison scale.
Figure 6:
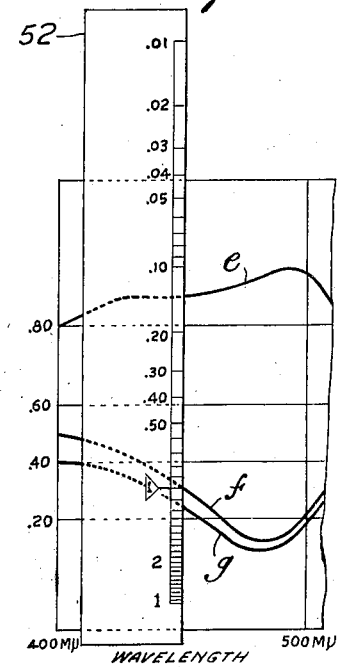
Fig. 6 illustrates the superposition of a suitable scale on Fig. 5 to predict the result of such an addition, the plot being shown fragmentarily.

On Fig. 5 are shown curves $e$ and $f$ which represent two different dye components. Curve $g$, on the same figure, shows the resultant of the mixture of these two components all applied to a transmission scale. When curves $e$ and $f$ are drawn in terms of specific absorptive property using the complex cam, it is necessary only to add their values read from log scale which may be superimposed over the curves as shown at 52 in Fig. 6. Curve $g$ can be calculated by reading the antilogs of the two curves $e$ and $f$ from a suitable log scale shown in the figure, adding them together, and re-entering the logarithm of their result. Mathematically, this is demonstrated as follows:

$$\log[\ ]_e = \log k_e c_e$$

and $$\log[\ ]_f = \log k_f c_f$$

from this $$\log[\ ]_{e+f} = \log [k_e c_e + k_f c_f]$$

The above method can of course be used with more than two components.

It will be noted that the drive of Fig. 2 may be divided into two portions, one linear drive from shaft 47 to pen 43 and a portion having a varying ratio, the single cam 46 and follower 49.

Although the general description of the present invention has been more particularly applied to dyeing and pigment problems, it should be understood that this was purely by way of illustration and the machine of the present invention is generally applicable to all transmission problems of spectrophotometry.

Although this presentation has been in terms of the application of coloring materials by coloring processes, it is contemplated to use the invention in other fields, such as the control of processes of manufacture of coloring materials and the standardization of their products. It is furthermore contemplated to use the invention for the prediction and analysis of spectrophotometric measurements, even those having no reference to color or even outside the visual range, for instance in chemical analysis and medical diagnosis.

The description of the invention has been in terms of its use with spectrophotometric measurements of visible light. The principles of the invention are obviously, however, applicable to any radiant energy capable of measurement by flickering beams. Thus, for example, by using suitable light sources and quartz optics with quartz-calcite polarizing prism together with proper photocell, the measurement can be carried into the ultra-violet and the drive linkage between photometering prism and record elements performs precisely the same functions as in the case of visible light. Similarly, measurements in the infra-red can be made wherever it is possible to obtain suitable monochromatic bands of infrared light, suitable optics and a suitably responsive photocell which may in the case of longer wave infra-red light be some type of bolometer. Therefore, when the term light is used in the claims, it is not intended to limit this term to its narrower meaning of visible light, but both ultra-violet and infra-red light is included.

This application is in part a continuation of my copending applications Serial No. 17,392 filed April 20, 1935, and Serial No. 65,489, filed February 24, 1936, now Patent No. 2,107,836 dated February 8, 1938.

I claim:

1. In a recording spectrophotometer of the flickering beam type for measuring the transmission of a colored sample in which a photometering element is moved to control the relative intensities of the beams and thereby to compensate for the transmission of the colored sample and in which a recording device is actuated to move a recording surface in accordance with wave length or frequencies of monochromatic light being introduced into the spectrophotometer, the improvement which comprises a drive linkage between the photometering element and a recording means operating on the recording surface, said linkage including a drive of varying ratio, the ratio of variation of said drive being such that the movement of the recording element is proportional to $$\log \log \frac{1}{t}$$

where $t$ is the transmission of the sample, whereby a curve is drawn on the recording surface which is invariant in shape with variations of concentration or of thickness of the colored sample.

2. In a recording spectrophotometer of the flickering beam type for measuring the transmission of a colored sample in which photometering is effected by rotating a polarizing prism through the angle $\alpha$ and in which a recording device is actuated to move a recording surface in accordance with wave length or frequency of monochromatic light being introduced into the spectrophotometer, the improvement which comprises a drive linkage between the photometering prism and a recording means operating on the recording surface, said linkage including a drive of varying ratio, the ratio variation of said drive being such that the movement of the recordng element is proportional to the square of the tangent of the angle through which the photometering prism is rotated modified by a function such that the movement of the recording element is proportional to $\log \log \cot^2 \alpha$, whereby a curve is drawn which is invariant in shape with variations of concentration or thickness of the colored sample.

3. A recording spectrophotometer according to claim 1 in which the drive of varying ratio is a cam.

4. A recording spectrophotometer according to claim 2 in which the drive of varying ratio is a cam.

ORRIN WESTON PINEO.